(12) United States Patent
Cheng

(10) Patent No.: US 9,934,590 B1
(45) Date of Patent: Apr. 3, 2018

(54) TCHEBICHEF MOMENT SHAPE DESCRIPTOR FOR PARTIAL POINT CLOUD CHARACTERIZATION

(71) Applicant: The United States of America, as represented by the Secretary of the Air Force, Washington, DC (US)

(72) Inventor: Huaining Cheng, Centerville, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 50 days.

(21) Appl. No.: 15/283,853

(22) Filed: Oct. 3, 2016

Related U.S. Application Data

(63) Continuation of application No. 15/190,772, filed on Jun. 23, 2016.

(60) Provisional application No. 62/184,289, filed on Jun. 25, 2015.

(51) Int. Cl.
| | |
|---|---|
| G06K 9/00 | (2006.01) |
| G06T 7/60 | (2017.01) |
| G06K 9/62 | (2006.01) |
| G06T 7/00 | (2017.01) |

(52) U.S. Cl.
CPC ............ G06T 7/606 (2013.01); G06K 9/6215 (2013.01); G06K 9/6276 (2013.01); G06T 7/0081 (2013.01); *G06T 2207/10028* (2013.01); *G06T 2207/20021* (2013.01)

(58) Field of Classification Search
CPC ................ G06K 9/6215; G06K 9/6276; G06T 2207/10028; G06T 2207/20021
See application file for complete search history.

(56) References Cited

U.S. PATENT DOCUMENTS

| 7,561,726 B2 | 7/2009 | Lu et al. |
| 8,605,093 B2 | 12/2013 | Fu et al. |
| 8,699,785 B2 * | 4/2014 | Balakrishnan ............ G06T 7/42 |
| | | 382/154 |

(Continued)

OTHER PUBLICATIONS

R. Mukundan, S.H. Ong, P.A. Lee, "Image analysis by Tchebichef moments," IEEE Trans. Image Process. 10 (9) (2001) 1357-1364.

(Continued)

*Primary Examiner* — Phuoc Tran
(74) *Attorney, Agent, or Firm* — AFMCLO/JAZ; Charles Figer Jr

(57) ABSTRACT

A process and apparatus are provided to characterize low-resolution partial point clouds for object recognition or query. A partial point cloud representation of an object is received. Zero and first order geometric moments of the partial point cloud are computed. A location of a center of a point cloud mass is computed using the geometric moments. A cubic bounding box is generated centered at the location of the mass center of the point cloud, with one side of the box bounding the point cloud at its longest semi-axis. The bounding box is divided into a three dimensional grid. A normalized voxel mass distribution is generated over the three dimensional grid. Tchebichef moments of different orders are calculated with respect to the voxel mass distribution in the grid. Low-order moments are collected to form TMSDs. Similarity is compared between the TMSD of the point cloud with TMSDs of other point clouds.

20 Claims, 11 Drawing Sheets

(56) References Cited

U.S. PATENT DOCUMENTS

| | | |
|---|---|---|
| 2003/0236645 A1 | 12/2003 | Santic |
| 2009/0232388 A1* | 9/2009 | Minear ................ G06T 3/0075 382/154 |
| 2011/0304619 A1 | 12/2011 | Fu et al. |
| 2013/0069936 A1 | 3/2013 | Tsai et al. |
| 2013/0321393 A1 | 12/2013 | Winder |
| 2014/0132604 A1 | 5/2014 | Bao et al. |
| 2015/0109415 A1 | 4/2015 | Son et al. |

OTHER PUBLICATIONS

R. Mukundan, "Some computational aspects of discrete orthonormal moments," IEEE Trans. Image Process. 13 (8) (2004) 1055-1059.

\* cited by examiner (100%)  (75%)  (50%)  (25%)  (6%)

TCHEBICHEF MOMENT SHAPE DESCRIPTOR FOR PARTIAL POINT CLOUD CHARACTERIZATION

CROSS-REFERENCE TO RELATED APPLICATIONS

This application is a continuation of U.S. application Ser. No. 15/190,772, entitled "Tchebichef Moment Shape Descriptor for Partial Point Cloud Characterization," filed on Jun. 23, 2016, which claims the benefit of and priority to U.S. Provisional Application Ser. No. 62/184,289, entitled "Tchebichef Moment Shape Descriptor for Partial Point Cloud Characterization," filed on Jun. 25, 2015, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to feature recognition and extraction from point cloud data.

Description of the Related Art

During the last decade, some advanced three-dimensional (3D) sensors, such as light detection and ranging (LIDAR) sensors, started appearing in various applications. Even though individual devices can have different designs, they usually provide 3D point clouds or gray/color scaled depth images of objects from a distance. With a quick accumulation of such data, there is a need in the art to study compact and robust shape description models for content-based information retrieval (CBIR) applications. However, these sensor outputs are generally not as good and complete as traditional 3D shape data of dense point clouds or watertight meshes generated by full-body laser scanners or graphics software. Instead, the sensor outputs provide partial views of 3D objects at a specific viewing angle. When human targets are involved, there are often self-occlusions that break a body's point cloud into random and disjoint patches. Low-resolution settings typically seen in standoff sensing systems further degrade meaningful point connectivity. These problems pose significant challenges for CBIR systems because such shape degeneracy and sparsity make feature extraction and representation difficult. Many existing 3D descriptors may not be applicable or suitable under this circumstance. For example, without a smooth dense point cloud, it would be difficult to acquire stable first order (surface normal) and second order (surface curvature) geometric properties.

Accordingly, there is a need in the art for feature identification and extraction from low-resolution, partial point cloud data generated by mobile and/or standoff sensors.

SUMMARY OF THE INVENTION

When three dimensional (3D) sensors such as light detection and ranging (LIDAR) are employed in targeting and recognition of human action from both ground and aerial platforms, the corresponding point clouds of body shape often comprise low-resolution, disjoint, and irregular patches of points resulted from self-occlusions and viewing angle variations. Many existing 3D shape descriptors designed for shape query and retrieval are unable to work effectively with these degenerated point clouds because of their dependency on dense and smooth full-body scans. Embodiments of this invention provide a new degeneracy-tolerable, multi-scale 3D shape descriptor based on a discrete orthogonal Tchebichef moment as an alternative for low-resolution, partial point cloud representation and characterization.

Embodiments of the invention utilize a Tchebichef moment shape descriptor (TMSD) in human shape retrieval. These embodiments were verified using a multi-subject pose shape baseline, which provided simulated LIDAR captures at different viewing angles. Some embodiments additionally utilized a voxelization scheme that is capable of achieving translation, scale, and resolution invariance, which is lesser of a concern in the traditional full-body shape models, but is a desirable requirement for meaningful partial point cloud retrievals.

Validation experimentation demonstrated that TMSD performs better than contemporary methods such as 3D discrete Fourier transform (DFT) and is at least comparable to other contemporary methods such as 3D discrete wavelet transforms (DWT). TMSD proved to be more flexible on multi-scale construction than 3D DWT because it does not have the restriction of dyadic sampling. The validation experiments were designed as single-view nearest neighbor (NN) queries of human pose shape using a newly constructed baseline of partial 3D point clouds, captured through biofidelic human avatars of individual human volunteers performing three activities—jogging, throwing, and digging. The NN query measures the similarity between the query pose shape's descriptor and the descriptors of other shapes in the pose shape baseline. The baseline provides a geometric simulation of LIDAR data at multiple viewing angles, organized into two subsets of horizontal (0 degree) and vertically-slant (45 degrees) elevation angles. Each subset consisted of more than 5,500 frames of point cloud patches obtained at different azimuth angles, grouped into 200 plus pose shape classes according to the action pose segmentation and azimuth angle. The construction of this baseline offered a unique advantage of performance evaluation at a full range of viewing angles. The validation experimentation demonstrated that TMSD maintains consistent performance under different elevation angles, which may have a particular significance for aerial platforms.

Complementary to TMSD, a new voxelization scheme was also designed to assist in providing translation, scale, and resolution invariance. The inclusion of scale and resolution normalization in the embodiments of the invention distinguishes these embodiments from many contemporary 3D shape search methods. The majority of contemporary methods only deal with full-body models in which a complete surface, rather than individual patches and their spatial relationships, defines shape similarity. Therefore, rotational invariance is the main concern of these models. However, in the case of partial point clouds, rotational invariance is meaningless because the point clouds are viewing angle dependent; instead the scale and resolution differences are important variations.

Embodiments of the invention employ a method of characterizing low-resolution partial point clouds for object query or recognition. A partial point cloud representation of an object is received. Zero and first order geometric moments of the partial point cloud are computed. A location of a center of a point cloud mass is computed using the zero and first order geometric moments. A cubic bounding box is generated centered at the location of the center of the point cloud mass, with one side of the box bounding the point cloud at its longest semi-axis. The bounding box is divided into a three dimensional grid. A normalized voxel mass distribution is generated over the three dimensional grid. Tchebichef moments of different orders are calculated with respect to the voxel mass distribution in the grid. The low-order moments are collected to form 3D Tchebichef Moment Shape Descriptor (TMSD)—a compact, one-dimensional numerical vector that characterizes the three-dimensional global shape pattern of the point cloud. Object query or recognition may then be performed by comparing the similarity between the TMSD of the point cloud with the TMSDs of other point clouds of known classes of shapes.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 3A-3C illustrate examples of partial point clouds for a subject;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
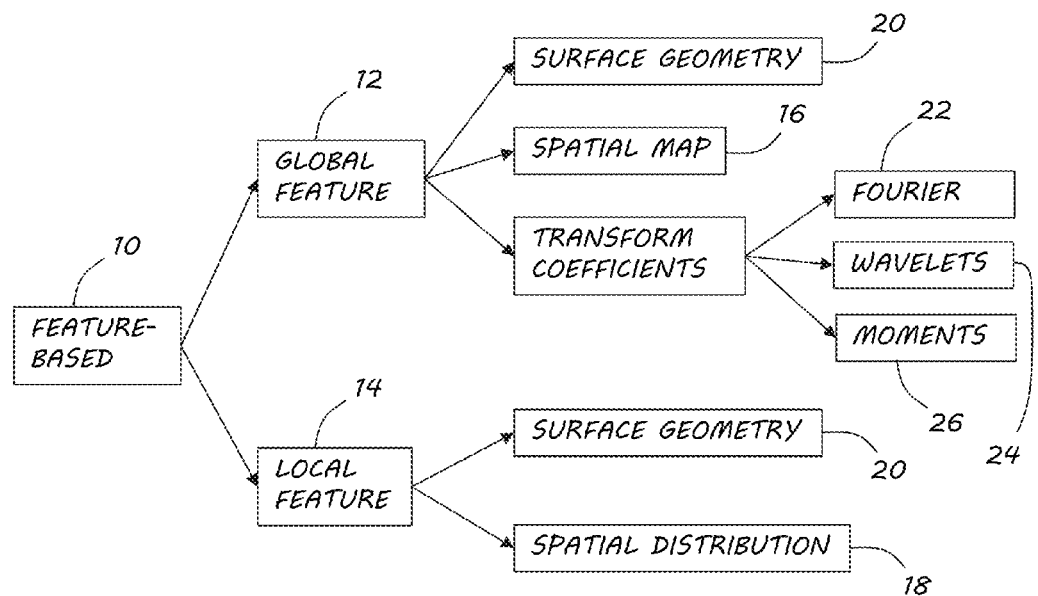
FIG. 1 is a diagram representing a taxonomy of feature-based 3D shape descriptors.

Feature-based descriptors 10 may be built upon three-dimensional (3D) spatial relationships, surface geometry, and transform coefficients as illustrated in FIG. 1. The use of spatial relationships leads to either a global spatial map 16 (global features 12) or a local feature 14 density distribution 18. The spatial map typically maps each surface mesh or sampling point into a global partition framework. For example, a cord-based descriptor captures an entire surface curvature of a shape by binning the angles between a cord (a vector from an object's center of mass to the center of a mesh triangle) and the first two principal axes as well as the radius of a cord. A 3D shape histogram counts the spatial occupancy of a point cloud in a global partition grid of concentric shell, pie-shaped sector, or spider web. Using a similar global partition grid, a 3D shape context records relative coordinates among N surface sample points. A shape impact descriptor describes a shape through the shape's surrounding Newtonian and relativistic fields, according to the gravity law.

A group of local feature density distributions usually have a density distribution of pairwise spatial relationships among surface sampling points, unrelated to any global partition. One contemporary approach is a 3D shape distribution, which can be constructed from pair-wise Euclidean distances or angles among surface sample points. Isometric invariant geodesic distance also has been introduced to produce a probabilistic shape description.

These contemporary descriptors of spatial relationship usually tolerate degeneracy and sparsity, and hence may be applicable to point cloud patches. However, while applicable, they are not well suited for feature recognition and extraction from point cloud patch data. Since every bin is equally important, a tradeoff must be made between descriptor size and performance. Moreover, a large number of histogram bins or a refined partition scheme could result in undesirable high dimensionality. Even though some data reduction techniques such as the Principal Component Analysis (PCA) have been used to reduce the dimensionality, it is very difficult to acquire datasets that are sufficiently large to achieve consistency. Thus, the data reduction outcome is tied with a specific dataset and is not scalable.

Surface geometry 20 type of descriptors are generated from local geometric properties, such as radial distance (zero order), surface normal (first order), and surface curvature (second order), etc. These local geometric properties can form both global 12 and local 14 shape descriptors, depending on whether they are aggregated to a global partition framework or collected as a bag of features.

The richness of surface geometry brings out many feature representation methods. Extended Gaussian image (EGI) records a variation of surface normal orientation and maps it to a unit Gaussian sphere. A shape index histogram is a more generalized form of surface curvature representation in which each bin of the histogram represents the aggregation of a specific type of elementary shape for approximating local surfaces over a Gaussian sphere. A contemporary local descriptor is a spin image, which defines a local surface around a key point by distances from the points in the key point's neighborhood to a tangent plane and normal vector at the key point. Other contemporary methodologies include a probabilistic description of surface geometry around uniformly sampled surface points, which is made from non-parametric Gaussian kernel density estimate (KDE). Diffusion geometry may be utilized in non-rigid shape retrieval due to the isometry invariance of the diffusion distance and robustness of the heat kernel to small surface perturbation. Finally, a histogram of oriented gradients (HOG) has been extended to 3D spatial grid for shape representation.

A common constraint or deficiency in these surface geometry based descriptors is that they generally require a stable and smooth local surface approximation, which is difficult to obtain from degenerated and sparse point cloud patches. Moreover, it is hard to identify any meaningful spatial extremity, maxima of curvature, and inflection point to use as a key point. Sampling may not always work well, either.

Transform coefficient based descriptors are created by decomposing (projecting) a global image or shape function to a set of new, usually orthogonal, basis functions. The low-order projection coefficients are usually collected to form a descriptor because the basis functions are designed to pack the main pattern or energy to a low-order subspace.

In contrast to the heuristic nature of many shape descriptors, orthogonal transform-based descriptors are mathematically sound and tight, because of orthogonality, completeness, and consistency. These properties provide some significant advantages that are otherwise not available in the aforementioned descriptors: 1) no redundancy in shape features, 2) capability of exact reconstruction or approximation with known cutoff error, 3) distance preservation in an embedded subspace, which is critical for multi-scale nearest neighbor (NN) query, and 4) better scalability and feature alignment due to fixed basis functions, even though this benefit is not a clear cut because the fixed basis may limit the expressiveness.

The orthogonal transform descriptors may be further divided into three subgroups of Fourier 22, wavelet 24, and moment 26, according to the family of basis functions used. In the Fourier group, spherical harmonics descriptor (SHD) is the most representative. It is essentially a 3D Fourier transform of a shape function defined over a set of concentric spheres in spherical coordinates. The appeal of SHD is its rotational invariance for watertight shape. However, this is irrelevant to viewing angle dependent point cloud patches. Moreover, realization of SHD on point clouds may encounter issues such as discretization error and non-uniform spherical surface grid. Therefore, a more applicable choice is the 3D discrete Fourier transform (DFT) descriptor 22, resulted from the sampled transform of a shape function over a discrete finite 3D grid. Results from embodiments of the invention will be compared with 3D DFT below.

Compared to the 3D Fourier transform 22, there are fewer applications of the wavelet transform 24 in 3D shape retrieval, probably due to the fact that many are not rotation invariant. A few exceptions are a rotation invariant spherical wavelet transform applied to a sampled spherical shape function and an isometry-invariant wavelet shape signature based on a spectral graph wavelet defined over an Eigenspace of Laplace-Beltrami (LB) operator.

Moments 26 were first introduced to 2D image analysis in the form of geometric moment invariants. The majority of follow on research on moments focused on various classical orthogonal polynomial families. These polynomial families are generally divided into continuous group and discrete group. The continuous orthogonal moments are mostly 2D radial kernel based (rotation-invariant), including 2D Zernike moments, pseudo-Zernike moments, and Fourier-Merlin moments. Even though the best-performing Zernike moment descriptor has been extended to 3D shape analysis, it is not a preferable method for point cloud analysis because of the use of spherical domain and two potential errors—a reconstruction cutoff error and an approximation error. The former is due to an infinite number of moments and the latter is due to the discrete nature of point clouds. The approximation error tends to accumulate as the moment order increases.

Discrete orthogonal moments assist in eliminating these errors. Among them, Tchebichef moments have demonstrated superior 2D image reconstruction performances compared with Zernike moments. However, Tchebichef moments have not been applied in 3D domain, due likely to the fact that Tchebichef moments are not rotation-invariant and may not be numerically stable at a higher order with a refined 3D grid. But, point cloud patch data is generally low-resolution, and therefore does not present such issues. Embodiments of the invention utilize a new Tchebichef moment shape descriptor (TMSD) for multi-scale 3D feature representation of the point cloud patches. The TMSD in some embodiments is generated from low-order 3D Tchebichef moments, which compact information on shape patterns to more easily enable a shape search in an embedded subspace. This reduced-dimension search is made possible by TMSD's property of distance preservation in the subspace, which prevents false negatives in a nearest neighbor search.

Finally, another alternative way of analyzing partial point clouds is to convert them into 2D depth images in which intensity or color scales are used to represent the z (depth) dimension. However, the validation experimentation presented below supports the proposition that the embodiments of the invention utilizing 3D-based TMSD outperform contemporary 2D-based depth image analysis for point cloud shape characterization and query.

Figure 2:
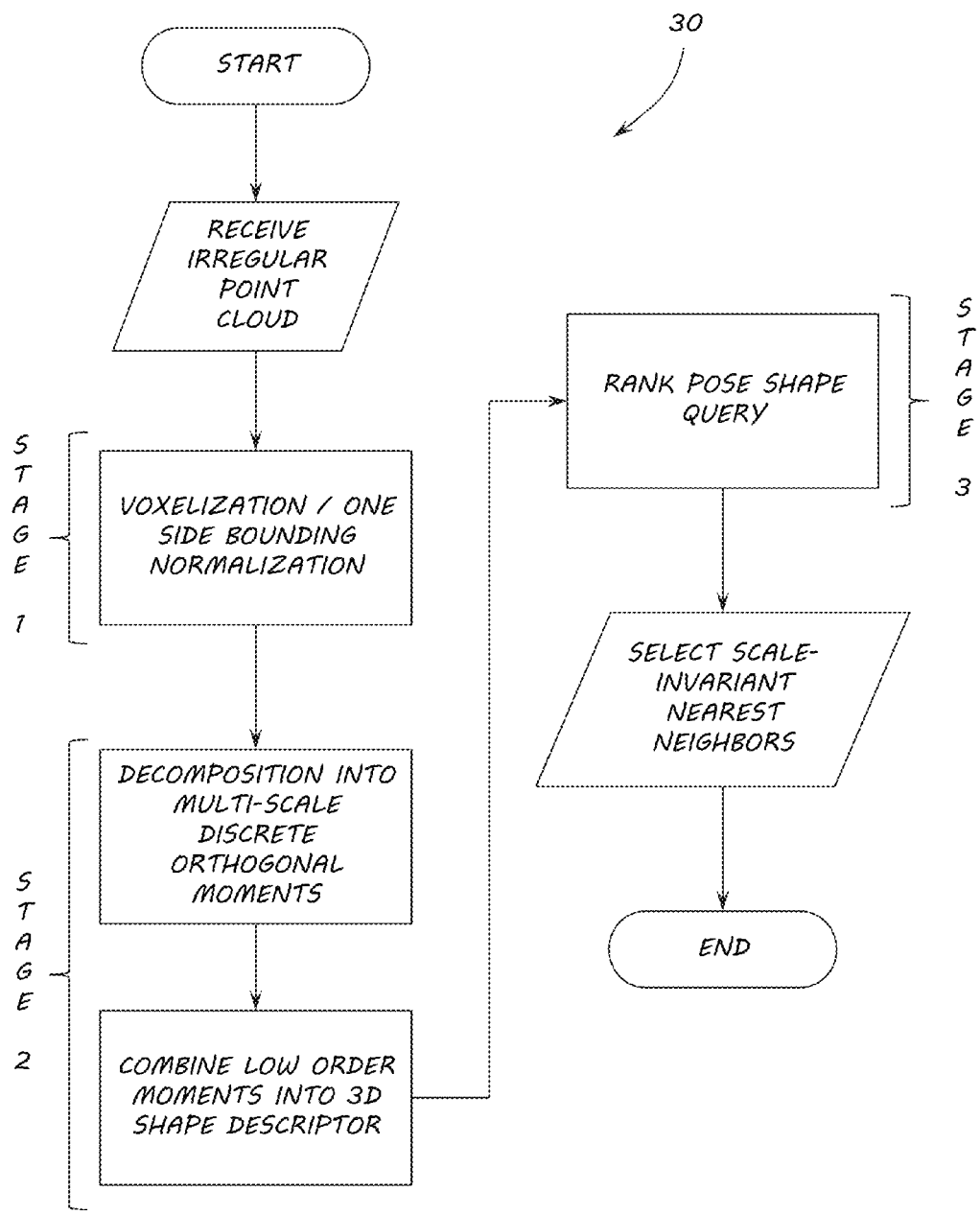
FIG. 2 is a flow diagram representing the several stages of a characterization process consistent with embodiments of the invention.

A shape query process 30 consistent with the embodiments of the invention comprises three stages as illustrated in FIG. 2. In general, the first preprocessing stage establishes a canonical reference for shape objects. The second feature extraction and formation stage abstracts raw shape data into some analytical structures (features). The third search stage conducts the nearest neighbor search or other statistical inference jobs with respect to the features. Each of these stages are described more fully below.

Figure 3C:
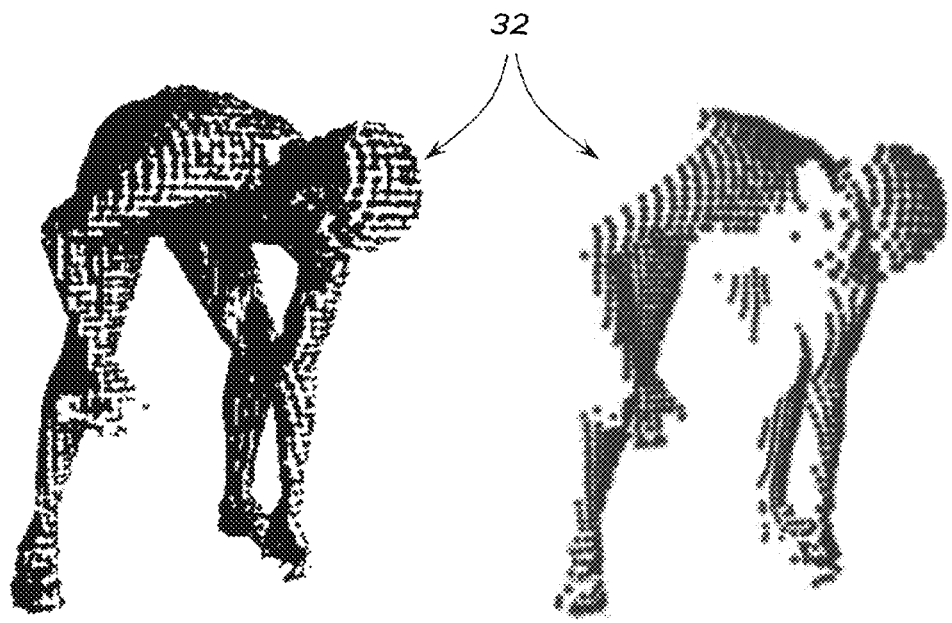
Figure 3C:
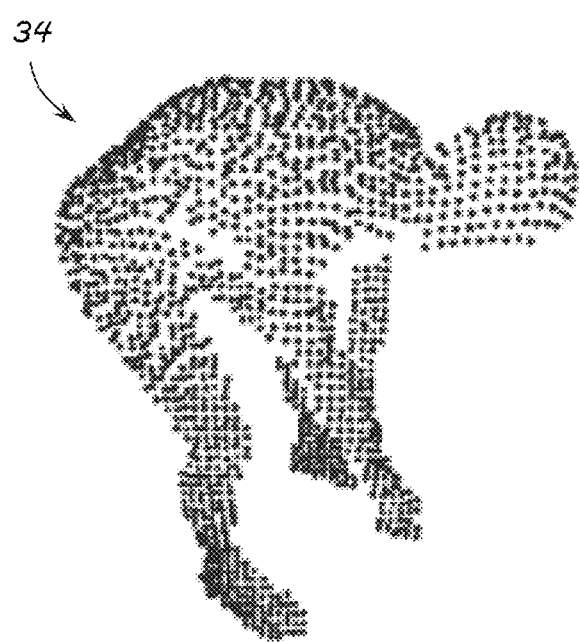

Human activity analysis is one area of applicability for embodiments of the invention. Since there are few publicly available human pose shape data with sufficient anthropometric and viewing angle variations, it was decided to use a hybrid experimental/modeling approach to generate dynamic partial 3D point clouds from orthographical ray-tracing of animations of biofidelic human avatars in order to validate the embodiments of the invention in this field. The avatars and animations of actions were made from actual body scans and motion capture data of individual volunteers—5 males and 4 females. FIG. 3A illustrates a point cloud patch 32 capture for an individual superimposed on a 3D body shape. FIG. 3B illustrates the same cloud patch without the superimposed body shape. The view-dependent point cloud patches in the ground-view subset were captured by a simulated 100-by-100 detector arrays at evenly-spaced 30 degrees of azimuth angle between 0 and 330 degrees. The azimuth angle is defined as the angle between the normal of a detector array and a subject's anteroposterior axis. The process was then repeated for the elevation angles of 45 degrees. For example, FIG. 3C illustrates a point cloud patch 34 captured from a different viewing angle than FIGS. 3A and 3B. These synthetic data were utilized as a full-scale baseline. An additional example of such point cloud patches is shown in FIG. 4 and marked as 100%.

Figure 4:
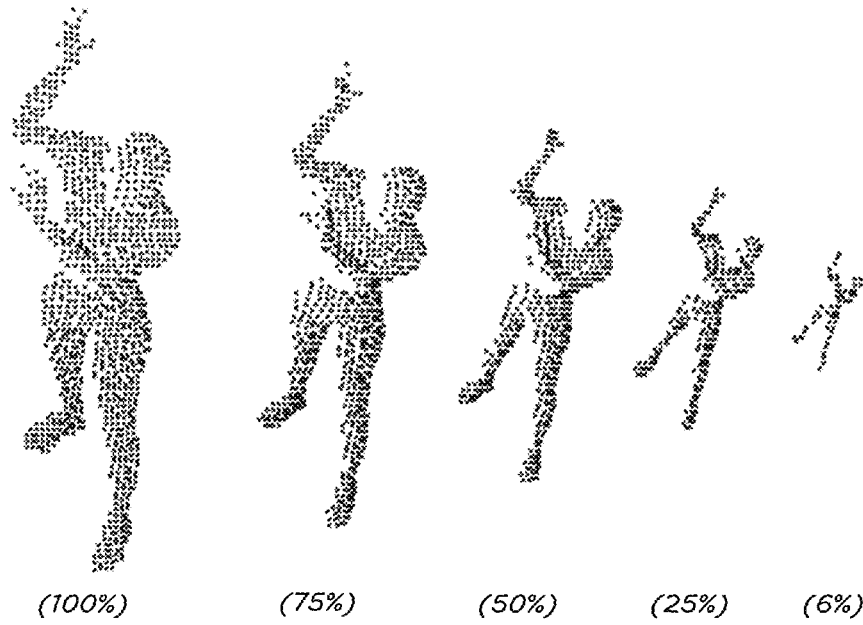
FIG. 4 illustrates a set of scaled point cloud patches of an initial digging pose of a female subject at a viewing angle of 0 degree azimuth and 45 degree elevation arranged according to a percentage of an original full-scale size.

The degeneracy of point cloud patches, such as those illustrated in FIG. 4, imposes a significant difficulty to the construction of any mesh-based surface models. Instead, voxelization is employed in formulating a distribution function for the point cloud patches. Voxelization encloses an entire point cloud with a 3D grid consisting of N×N×N equal-sized cubes (voxels) placed evenly along each dimension. A common value of N used in 3D voxelization is 64. Embodiments of the invention may use a grid size set to N=16, 32, 64, in addition to other sizes.

In an uncontrolled setting, the shapes of raw point cloud data are usually not translation and scale normalized. Even for the full-scale baseline data, the scale may not be controlled exactly due to the initial uncalibrated rough positioning of the simulated detector array during the data capturing process. There are also body size differences among human subjects. In addition, there is another resolution type variation in the form of varying global density among different sets of point cloud captures because of different sensor or mesh resolutions. All three variations are also present in real-world 3D sensor data. In order to test the voxelization and normalization scheme in the embodiments of this invention, four subjects, two for each gender, were selected from nine baseline subjects to produce similar types of point clouds at different scales of 75%, 50%, 25%, and 6% of the original detector size, as shown in FIG. 4. Note that the point cloud of 100% has 987 points whereas the point cloud of 6% has only 61 points—a significant difference highlighting the importance of scale and resolution normalization.

In moment-based 2D image analysis, there are two general approaches to handle translation and scale invariance issues. The first approach is a direct normalization of data, and the second is a development of translation and scale invariants of moments. The direct normalization typically uses the zero and first order of geometric moments to move the object origin to its center of mass and readjust its size (mass) to a fixed value. The concept of moment invariants was first introduced for 2D geometric moments in the form of ratios of central moments. They were utilized later in the derivation of invariants for other orthogonal moments. The main advantage of direct data normalization is that it is a preprocessing not related to descriptors, thus descriptors are not altered to achieve invariance. However, direct data normalization introduces a small scaling approximation error. Alternatively, moment invariants can avoid scaling errors, but they no longer possess the properties of orthogonality and finite completeness.

Figure 5:
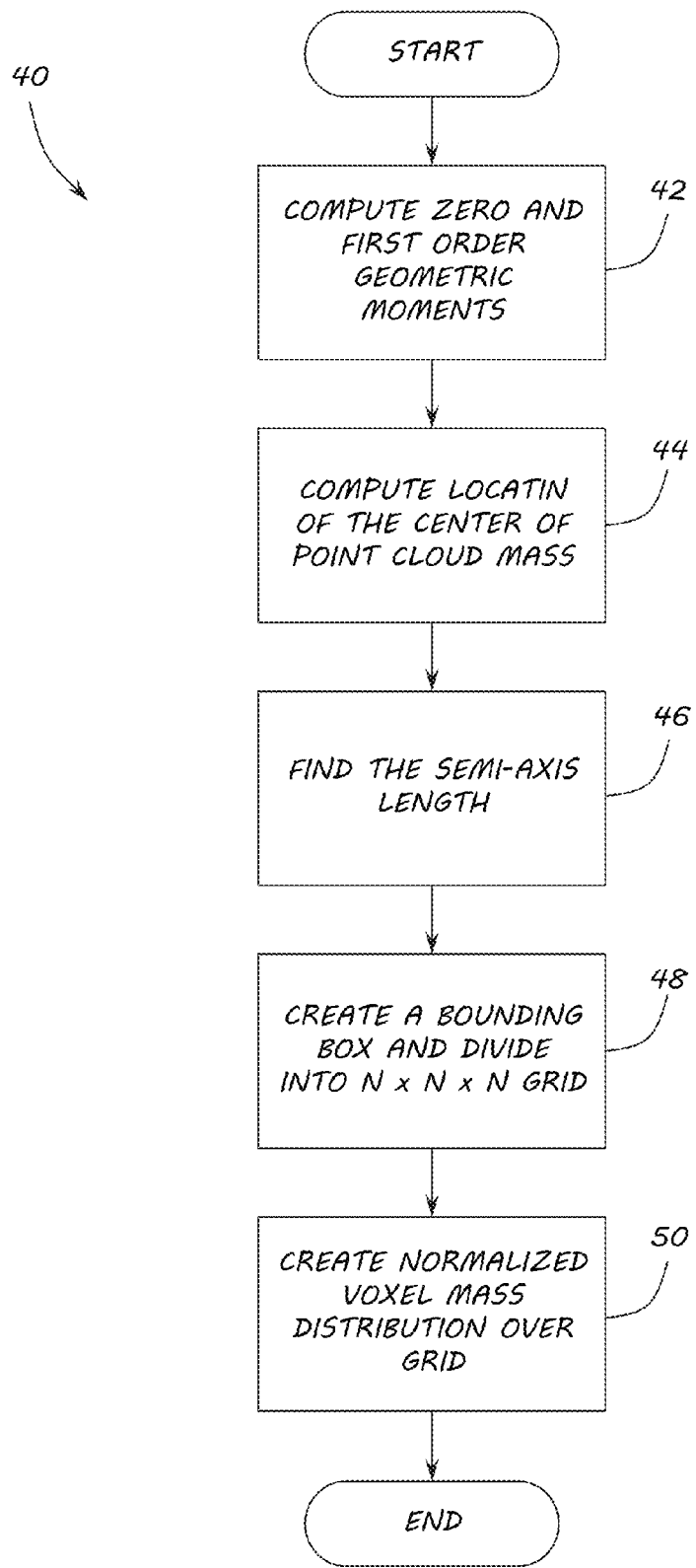
FIG. 5 is a flow diagram of a 3D voxelization and direct normalization scheme utilized by embodiments of the invention.

Considering an extra computation burden of invariants and a need for resolution normalization, a new 3D voxelization and direct normalization scheme that is utilized by embodiments of the invention is proposed and referred to as Proportional Grid of Voxelization and Normalization (PGVN). PGVN is a direct normalization but not a 3D extension of the aforementioned 2D methods. PGVN consists of a voxelization with a one-side bounding box originated at the center of mass and a normalization of the total point cloud mass to a fixed value. Denoting a point cloud as $\{pt_i | 1 \leq i \leq N_{pt}, N_{pt} \in \mathbb{N}\}$ and a grid of N×N×N cubes as $\{C_{x,y,z} | 1 \leq x,y,z \leq N\}$, where $C_{x,y,z}$ represents the collection of points within the cube at (x,y,z), the voxelization and normalization with respect to the simulated sensor reference system is presented in flowchart 40 in FIG. 5.

The zero and first order geometric moments are computed in block 42 by setting a unit mass for each point at $(x_i^{cam}, y_i^{cam}, z_i^{cam})$. Here, the superscript 'cam' represents the simulated sensor reference system. The location of the center of point cloud mass, $(x_c^{cam}, y_c^{cam}, z_c^{cam})$, is computed in block 44 using the results from block 42. The semi-axis length bx is found, in block 46, with respect to the origin at $(x_c^{cam}, y_c^{cam}, z_c^{cam})$, bx=max $\{|x_i^{cam}-x_c^{cam}|, |y_i^{cam}-y_c^{cam}|, |z_i^{cam}-z_c^{cam}|, 1 \leq i \leq N_{pt}\}$. A bounding box of size 2bx×2bx×2bx, is created in block 48 centered at $(x_c^{cam}, y_c^{cam}, z_c^{cam})$ and divided into a N×N×N grid. N is usually an even number. Finally, a normalized voxel mass distribution $f(x,y,z)$ is created in block 50 over the grid, with the total mass being set to a constant β:

$$f(x, y, z) = \frac{\sum_{pt_i \in c_{x,y,z}} pt_i}{N_{pt}} \times \beta \qquad (1)$$

The moments computed with respect to $f(x,y,z)$ and the PGVN grid are translation, scale, and resolution invariant. The translation invariance is achieved by co-centering point clouds at their mass centers. The one-side bounding box set in blocks 46 and 48 normalizes the size of point clouds relative to the common PGVN grid reference system. Coupled with the scale normalization, block 50 accomplishes the resolution invariance by introducing a relative voxel mass distribution, $f(x,y,z)$, against a constant total mass value of β. In an illustrative embodiment, β values (e.g., 20,000 for a 64×64×64 grid) were chosen to make $f(x,y,z)$ fall into the range of MATLAB color map for easy visualization purpose.

Additionally for the purpose of performance comparison between the illustrated embodiment of 3D-based TMSD and contemporary 2D-based depth image analysis, block 50 of flowchart 40 was changed to mark the voxel occupancy distribution $f_B(x,y,z)$ over the grid:

$$f_B(x, y, z) = \begin{cases} 1 & \text{if } |C_{x,y,z}| \geq 1 \\ 0 & \text{if } |C_{x,y,z}| = 0 \end{cases} \forall\, 0 \leq x, y, z \leq N-1, \qquad (2)$$

where |•| represents the cardinality of a set, i.e., the number of points in cube $C_{x,y,z}$. Equation (2) allows for a direct performance comparison between the 3D descriptors of a binary voxelization and the 2D descriptors of a depth image that is converted directly from the same binary voxelization.

Figure 6:
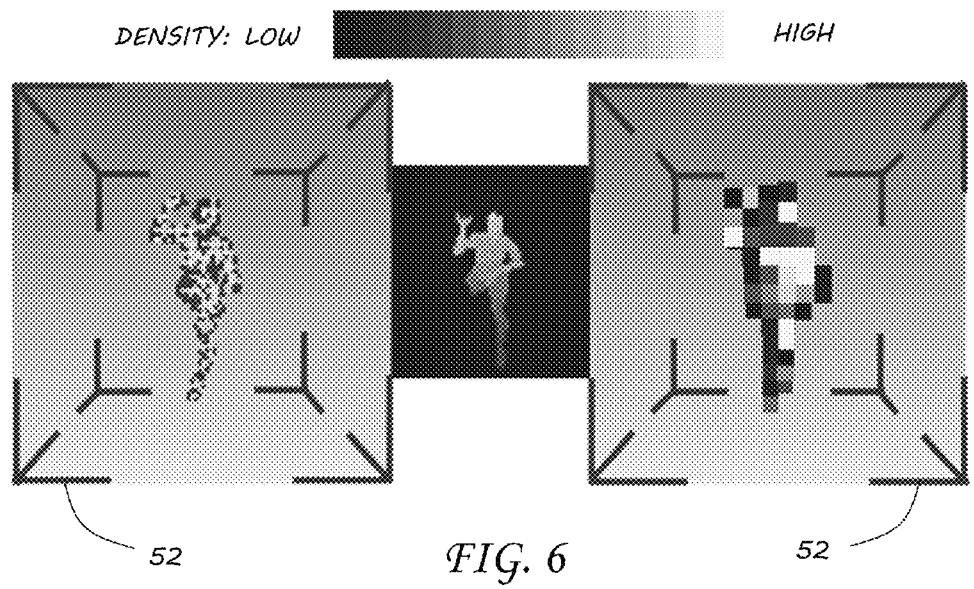
FIG. 6 illustrates examples of PGVN 3D shapes at a 45 degree elevation for a subject.

FIG. 6 illustrates a rendering of PGVN examples of grid size N=64 and N=16, which include an initial throwing pose shape of a female subject. The corresponding proportional bounding boxes 52 are the boxes around the picture edges. The one-side bounding can be seen more clearly in the depth image corresponding to grid size N=64. Note that some of the voxelization density unevenness shown in FIG. 6 is due to the difficulty in achieving and maintaining a strictly uniformed mesh during a capture of simulated data, which actually makes the simulated data closer to the real-world LIDAR signal with random noise.

Moment can be defined as a projection of a real function $f$ to a set of basis (kernel) function $\psi=\{\psi_i | i \in \mathbb{N}\}$ as:

$$\mu_i = \mathfrak{L}[f, \psi_i] = \mathfrak{L} \; f, \psi_i \mathfrak{L}, \quad (3)$$

where $\mu_i$ the i-th order moment and $\mathfrak{L}$ is the moment functional defined by the inner product $f \; f, \psi_i f$. In some embodiments, a basis function set $\psi$ may span the inner product space, i.e., $\psi$ that forms a complete basis. Another desirable property of basis functions is the orthonormality.

Discrete Tchebichef polynomials belong to a Hahn class of discrete orthogonal polynomials. The n-th order discrete Tchebichef polynomial, $t_n(x)$, can be expressed in the form of a generalized hypergeometric function $_3F_2(\bullet)$ as:

$$t_n(x) = (1-N)_n {}_3F_2(-n, -x, 1+n; 1, 1-N; 1) \quad (4)$$

$$= (1-N)_n \sum_{k=0}^{n} \frac{(-n)_k (-x)_k (1+n)_k}{(k!)^2 (1-N)_k},$$

where n, x=0, 1, . . . , N−1, and $(a)_k$ is a Pochhammer symbol given by $$(a)_k = a(a+1)(a+2) \ldots (a+k-1) = \frac{\Gamma(a+k)}{\Gamma(a)}, k \gg 1 \text{ and } (a)_0 = 1. \quad (5)$$

$\Gamma(a)=(a-1)!$ is the Gamma function. In the illustrated embodiment, N is the size of either a 2D (N×N) depth image or a 3D (N×N×N) voxelization grid, and x corresponds to one of the grid coordinate variables. The basis function $\{t_n(x)\}$ satisfies a finite orthogonality relation over discrete points of x:

$$\sum_{x=0}^{N-1} t_n(x) t_m(x) = \rho(n, N) \delta_{nm}, m, n = 0, 1, \ldots, N-1. \quad (6)$$

Here $\rho(n,N)$ is a normalization function that can be used to create orthonormality as:

$$\rho(n, N) = \quad (7)$$
$$(2n+1)^{-1} N(N^2-1)(N^2-2^2) \ldots (N^2-n^2) = (2n)! \binom{N+n}{2n+1}.$$

Dividing $t_n(x)$ by $\beta(n,N)=\sqrt{\rho(n,N)}$, the order-scale normalized Tchebichef polynomials may be obtained as:

$$\tilde{t}_n(x) = \frac{t_n(x)}{\beta(n, N)}. \quad (8)$$

The orthonormality resulted from Equation (8) removes large scale fluctuations at different orders of Tchebichef polynomials and $\{\tilde{t}_n(x)\}$ can be efficiently computed using recurrence relationships associated with the orthogonal polynomials. Taking $\{t_n(x)\}$ as the basis set and applying the discrete form of Equation (3), an individual discrete 3D Tchebichef moment of order (n+m+l) for the voxel mass distribution $f(x,y,z)$, over an N×N×N grid, can be defined as:

$$T_{nml} = \sum_{x=0}^{N-1} \sum_{y=0}^{N-1} \sum_{z=0}^{N-1} \tilde{t}_n(x) \tilde{t}_m(y) \tilde{t}_l(z) f(x, y, z), 0 \le n, m, l \le N-1. \quad (9)$$

In Equation (9), the grid reference origin is its back and bottom-left corner. There are total $N^3$ number of $T_{nml}$s with the maximum order of 3×(N−1). Among them, a small subset consisting of the first R-th order moments, $R \ll N^3$, is used to form the 3D Tchebichef Moment Shape Descriptor (TMSD):

$$\text{TMSD} = [T_{001}, T_{010}, T_{100}, \ldots, T_{nml}, \ldots, T_{R00}]^T, 0 < n+m+l \le R. \quad (10)$$

Excluding the constant zero-order term, if R<N, the dimension of TMSD is $$\frac{1}{6}(R+1)(R+2)(R+3) - 1.$$

The reverse process of Equation (9) reconstructs the original point cloud voxelization from its moments:

$$f(x, y, z) = \sum_{n=0}^{N-1} \sum_{m=0}^{N-1} \sum_{l=0}^{N-1} \tilde{t}_n(x) \tilde{t}_m(y) \tilde{t}_l(z) T_{nml}, 0 \le x, y, z \le N-1. \quad (11)$$

The low-order descriptor TMSD is an approximation of the general pattern of point cloud patches in an embedded subspace of lower dimension. The extent of dimension reduction brought by the descriptor can be very significant. For example, a voxel-based model of point clouds with N=64 could have as many as 262,144 voxels, whereas an approximation using a TMSD of R=16 requires only 968 moment terms. More importantly, this orthogonal approximation decouples and compacts the spatially correlated point distribution into the low-order modes determined solely by the polynomial basis $\{\tilde{t}_n(x)\}$. The process of decoupling, alignment, and compacting of pattern information assists in overcoming the exponential increase in resource requirements related to dimensionality. It enables pose shape queries through the embedded orthogonal domain, which would be otherwise unrealistic or ineffective in the original voxel domain.

For those PGVN 2D depth images (see FIG. 6) used in the comparison of 2D depth images to the 3D TMSD, the 2D Tchebichef moments with respect to the grayscale intensity functions, i(x,y), are given as follows:

$$T_{nm} = \sum_{x=0}^{N-1} \sum_{y=0}^{N-1} \tilde{t}_n(x) \tilde{t}_m(y) I(x, y), 0 \le n, m \le N-1, \quad (12)$$

where I(x,y) is given by an orthographical projection and the grayscale conversion of the binary voxelizaton in Equation (2) to the grid's (x,y) plane. The corresponding 2D Tchebichef Moment Image Descriptor (TMID) is formed in the similar way as in Equation (10) by collecting the first R-th order moments.

Replacing $\tilde{t}_n(x)$ in Equation (9) with the familiar DFT basis of $$e^{-j2\pi\left(\frac{nx}{N}\right)},$$

3D DFT can be expressed as:

$$F_{nml} = \frac{1}{\sqrt{N^3}}\sum_{x=0}^{N-1}\sum_{y=0}^{N-1}\sum_{z=0}^{N-1} f(x,y,z)e^{-j2\pi\left(\frac{nx}{N}+\frac{my}{N}+\frac{lz}{N}\right)}, \qquad (13)$$

$$0 \le n, m, l \le N-1.$$

The shape descriptor is formed similarly as TMSD using the low-order transform coefficients. However in this case, the norms of the coefficients, $\|F_{nml}\|$, are used in place of the actual complex numbers.

Unlike the single close-form basis set of Tchebichef moments and that of DFT, there are many basis families for the wavelet transform. Even though most of them do not have analytical representations, each can be characterized generally as a set of basis functions generated by scaling and translating its basic mother wavelet $\psi(x)$ as $$\psi_{a,\tau}(x) = \frac{1}{\sqrt{a}}\psi\left(\frac{x-\tau}{a}\right),$$

where $a$ and $\tau$ are scaling and translation factors, respectively. Three types of wavelets—Haar (db1), Daubechies (db4), and Symlet (Sym4) wavelet filters have been explored for embodiments of the invention. They were chosen mainly due to their fast band-pass filter bank implementation which is desirable for efficient analysis. Among the three chosen types, Haar plays the role of performance baseline. Daubechies is the most widely used wavelet family but asymmetric. Since symmetry is a relevant pattern in shape analysis, symlets family were included which is near symmetric. Although there are some other families having the similar properties, the three selected wavelet families are representative and sufficient for evaluating the performance of wavelet-based approach.

More specifically, for the efficient filter bank implementation with dyadic sampling, denoting the level index as $j \in \mathbb{N}$, $0 \le j < \log_2 N$ and the spatial index at level $j$ as $k \in \mathbb{N}$, $0 \le k < 2^j$, there is a set of orthogonal scaling function basis, $\varphi_{j,k}(x)=2^{j/2}\varphi(2^j x-k)$, which spans the approximation subspace $V_j = \text{span}\{\varphi_{j,k}(x)\}$, and the set of orthogonal wavelet function basis, $\psi_{j,k}(x)=2^{j/2}\psi(2^j x-k)$, which spans the details subspace $W_j = \text{span}\{\psi_{j,k}(x)\}$. Therefore, at a specific approximation level $j_0$, the entire domain space is spanned by $V_{j_0} \oplus W_{j_0} \oplus W_{j_0+1} \oplus \ldots \oplus W_{N-1}$, where $\oplus$ represents the composition of non-overlapping subspaces. For modeling general patterns, the approximation coefficients can be used to form the 3D wavelet shape descriptors, which are given as:

$$A_{j_0,k} = \frac{1}{\sqrt{N^3}}\sum_{x=0}^{N-1}\sum_{y=0}^{N-1}\sum_{z=0}^{N-1} f(x,y,z)\varphi_{j_0,k_x}(x)\varphi_{j_0,k_y}(y)\varphi_{j_0,k_z}(z). \qquad (14)$$

For the grid size N=16, 32, or 64, the value of $j_0$ is set accordingly to obtain an 8×8×8 approximation array, which is slightly larger than the size of TMSD at R=12.

The single-view, multi-scale NN query of a pose shape is implemented in embodiments of the invention as a k-NN query which returns the query shape's top k ranked nearest neighbors in the aforementioned pose shape baseline. More specifically, the ranking is based on the similarity (i.e., distance) between the query pose shape's descriptor and the descriptors of other shapes in the pose shape baseline. It is conducted in an embedded lower-order subspace of the pose shapes, because the full order descriptors represent the complete pose shapes in the form of PGVN voxel models of point cloud patches. In a general-purpose CBIR system, a content data depository is in place of the pose shape baseline and populated with the point clouds of concerned objects.

This subspace k-NN query strategy grows out from the necessity of working around the high-dimensionality issue. The high dimensionality not only makes the distance very expensive to compute but also may render the distance in the original N×N×N voxel space meaningless under some circumstance, for example, if the data points are drawn from independent and identical distributions. Thus k-NN query becomes more challenging than typical class-based pattern recognition. The latter relies on inter-class distances which often have better pair-wise stability than intra-class distances that the former has to deal with.

Moreover, unlike pattern recognition where users may expect certain level of false positives and false negatives, users of a CBIR system, for example the Google® Search, have a much lower tolerance on false negatives than false positives. They expect at least that they can find the nearest neighbors in the search returns. Therefore, it is not desirable to overestimate distance in the embedded space, such that a potential qualified NN shape is falsely dismissed. This requirement can be met if a descriptor and its distance measure satisfy the lower bounding distance condition.

Let $d_F(\cdot,\cdot)$ be the distance function in an embedded descriptor space and $d_O(\cdot,\cdot)$ be the distance function in the original pose shape space. If $s_1$ and $s_2$ denote the shape descriptors of pose shapes $o_1$ and $o_2$, respectively, and $s_1^l$ and $s_2^l$ denote the truncated, lower-order versions of $s_1$ and $s_2$, respectively, then the semantics of multi-scale lower bounding distance condition can be expressed as:

$$d_F(s_1^l,s_2^l) \le d_F(s_1,s_2) \le d_O(o_1,o_2) \qquad (15)$$

For 3D TMSD, Equation (15) can be proofed with Euclidean distance based on the orthonormal property. In the illustrated embodiment, Manhattan distance was used because it is more efficient and behaves better than the Euclidean distance under high dimensionality. It also lower-bounds the Euclidean distance.

Equation (15) cannot prevent false positives. However, this is much less of a concern in practice because TMSD has excellent energy compacting power and its lower-order terms seem to have most of the intrinsic dimensions, as illustrated below in the experiments results.

Six types of benchmark performance experiments have been conducted using subspace k-NN query with various sets of descriptors computed from PGVN baseline pose shapes, except for experiment 1. They are: 1) reconstruction of PGVN pose shape from 3D TMSD, 2) experiment of different orders of descriptor and grid sizes on the retrieval performance of 3D TMSD, 3) test of 3D-outperform-2D hypothesis using 2D TMID and binary 3D TMSD, 4) performance comparison between 3D TMSD, 3D DFT, and 3D DWT descriptors, 5) evaluation of the effect of viewing angle, and 6) evaluation of scale and resolution normalization. To make the charts less crowded, only the results for zero elevation angle are presented for experiment 2, 3, and 4. The results for 45 degree elevation angle are similar for these three experiments.

Table 1 lists the configuration parameters for the descriptor sets used in the experiments, except for the viewing angle already specified above. There are four common parameters: shape descriptor type (SD), descriptor order (R), grid size (N), and elevation angle (EL). Another special parameter is wavelet type (WL). A single set of descriptors has a unique combination of these configuration values.

TABLE 1

Configuration Matrix of Descriptor Dataset

| Parameters | Values |
| --- | --- |
| Descriptor Type (SD) | 2D TMID, 3D TMSD, 3D B-TMSD, 3D DFT, 3D DWT |
| Descriptor Order (R)* | 4, 6, 8, 12, 16, 20, 24 |
| Grid Size (N) | 16, 32, 64 |
| Elevation Angle (EL) | 0, 45 |
| Wavelet Type (WL)† | db1, db4, sym4 |

*Not applicable to wavelet analysis.
†Only applicable to wavelet analysis

To evaluate retrieval performance, the pose shapes are categorized into key pose shape classes. This is done by segmenting an action into several predefined consecutive phases. For example, a throwing action consists of three phases—wind (hand holds backward), swing (hand swings over the head), and throw (hand stretches out forward). A class of pose shapes is defined as the collection of the pose shapes of all subjects within the same action phase at a specific viewing angle. The resulted dataset and class labels are treated as the ground truth for performance evaluation. The retrieval performance measure used in these experiments is the averaged precision-recall (PR) curve in which the precision is the average interpolated precision over all the assessed queries at 11 recall values evenly spaced from 0% to 100%. In all the following experiments except for the scale invariance tests, the pose shape being queried is always present in the descriptor dataset and hence the first-ranked. Thus, the interpolated precision is 1 at the recall value of 0.

The PR curve is widely used in the performance evaluation of CBIR systems where each class size is very small compared to the size of the search domain. In the embodiments of the invention, and more specifically the illustrated embodiment, the ratio is in the order of less than one hundredth. The ideal case of the PR curve is when all classes have similar class sizes. Even though this ideal condition cannot be satisfied strictly due to the difference in the number of frames of individual actions, the action segmentation has reduced the discrepancy in class size. Overall, class sizes are between 10 and 64, and the PR curve is a suitable and valid performance measure.

Figure 7:
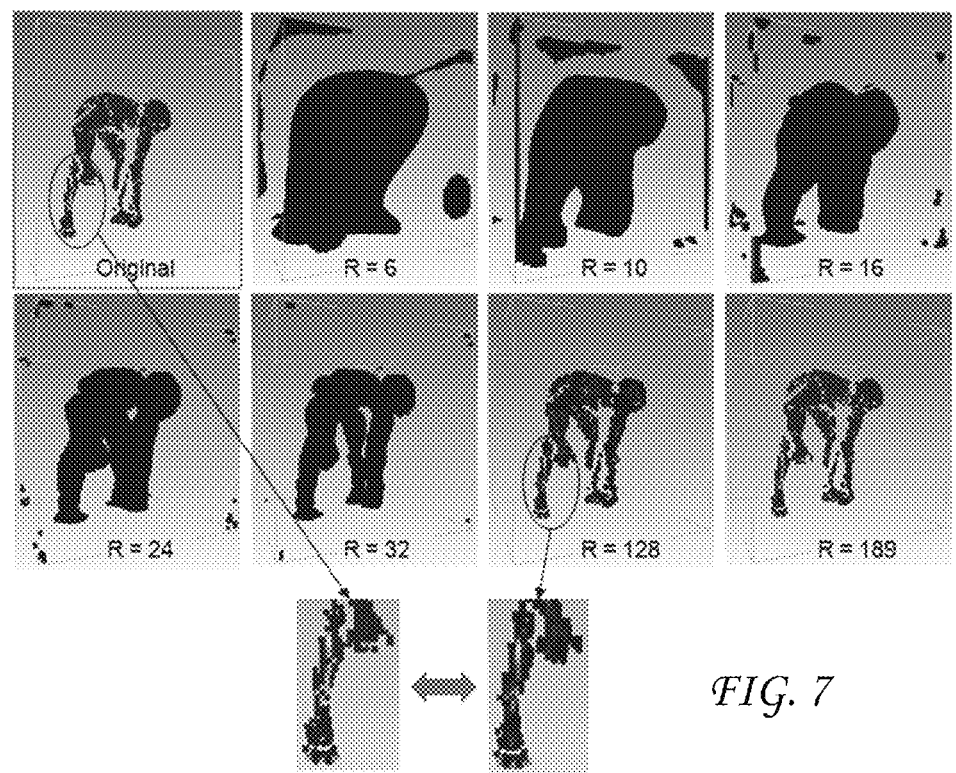
FIG. 7 illustrates reconstruction of a digging pose shape (PGVN processed point cloud patches) from a 3D TMSD with varying moment orders.

A few PGVN pose shape reconstructions using 3D TMSDs were conducted to visualize the ability of 3D TMSD on representing degenerated point cloud patches, to confirm the soundness of our TMSD implementation, and to identify the range of moment orders for an effective pose shape query. FIG. 7 illustrates the reconstruction of a set of 64×64×64 PGVN pose shapes using 3D TMSDs of different orders, computed from the original pose shape (indicated in FIG. 7 as "Original"). The original PGVN pose shape is from a digging action captured at the viewing angle of zero azimuth and zero elevation. It contains 1,013 occupied voxels, with a normalized total mass constant $\beta=20,000$. In this particular case, the mass distribution among the voxels of the original pose shape is more or less uniform and hence very close to the point distribution in the raw point cloud patches.

In each subgraph of FIG. 7, the pose shape is rotated to the right for an easier view, and the corresponding PGVN bounding box is shown to provide a common volume reference. Note that an exact reconstruction may be obtained using the full set of Tchebichef moments up to the maximum order R=189. The subgraph of order 189 has the same number of voxels and the mass distribution as those of the original PGVN pose shape. However, the subgraph of order R=128 is already very close to the original pose shape in details—the right thumb is distinguishable, and the right toes have the same pattern of mass concentration. These details are shown in the two magnified comparison boxes in the figure.

Another observation is the refinement of the reconstruction, progressing through the gradual concentration of voxel mass from the lower-order to the higher-order approximation. This explains a gradual reduction of some polynomial fitting errors that appear as residual voxels around the edges and corners of the PGVN grid. The mass values of the residual voxels keep reducing when the order increases. At the maximum order R=189, the mass of any residual voxel is less than $10^{-14}$, effectively zero.

For effective pose shape query, descriptors of order between 10 and 24 seem to have sufficient discriminative power. Their dimensions are below 3,000, comparable to the size of many other image or shape feature vectors. Therefore, it is the range of descriptor orders explored in later experiments. This reconstruction example demonstrated surprisingly good and robust shape compacting capability of 3D TMSD, considering the significant degeneracy in the point cloud patches.

Figure 8:
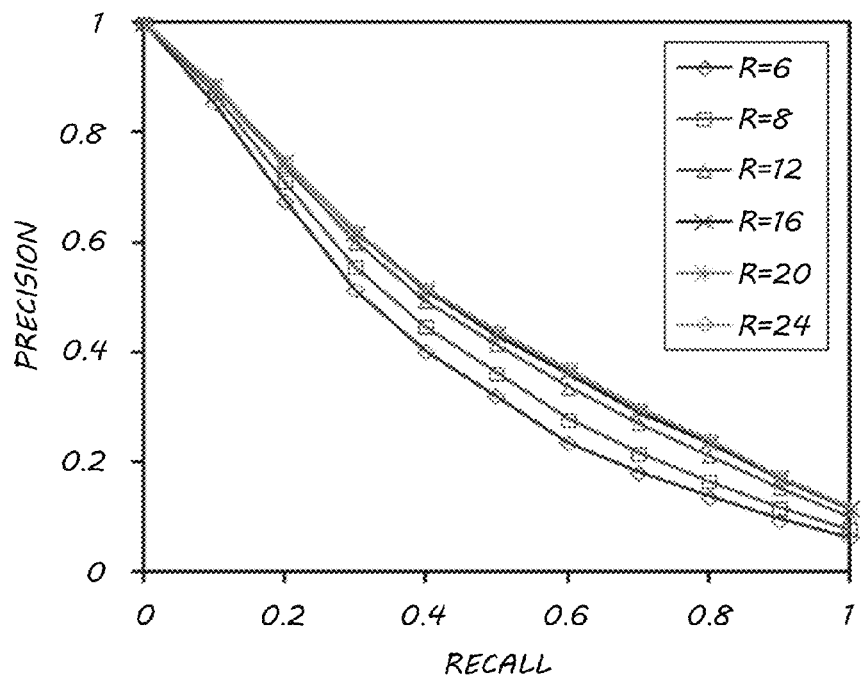
FIG. 8 is a graph of PR curves of pose shape queries using descriptors of different orders.

This next set of experiments assesses the effect of different moment orders and grid sizes on the retrieval performance. It served as a learning process to find the optimal setting for those parameters. FIG. 8 shows the PR curves of pose shape queries using 3D TMSDs of different orders. It appears that the descriptors of R=6 and 8 are less than desirable. On the other hand, the descriptors of R=16, 20 and 24 are almost overlaying each other. Since the dimension the descriptor of R=16 is a moderate value of 968, R=16 was considered as the optimal order for this illustrated embodiment regarding human shape characterization, though other embodiments may use other order values, depending on the complexity of object shape and the desired level of details in shape representation.

The diminishing performance gain as the moment order increases above R=16 may indicate the loss of effectiveness of distance measures, even though increasing the moment order brings in a better shape representation as evidenced by the previous reconstruction example. Another possible cause is that the 968 dimensions corresponding to R=16 may constitute the majority of the intrinsic dimensions.

Figure 9:
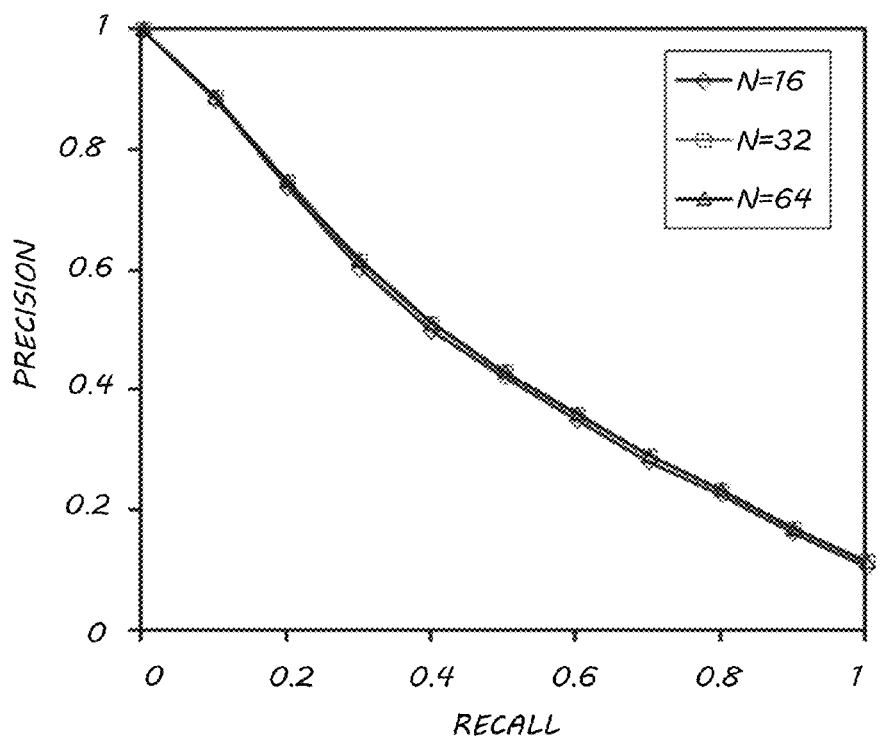
FIG. 9 is a graph of PR curves of pose shape queries using different grid sizes.

The set of PR curves in FIG. 9 shows the effect, actually the lack of effect, of grid size on the retrieval performance. A possible explanation could be made from FIG. 6 by comparing the MeshLab drawings of the refined voxelization (N=64) and the coarse (N=16) voxelization. Even though the coarse voxelization removes some shape details, it produces greater mass difference among individual voxels, as evidenced by the wider range of voxel colors. In other words, some pose shape information is retained through a more distinct mass distribution function $f(x,y,z)$ which in turn preserves the inter-class separation of pose shapes at N=16. The significance of this observation is that the issues related to the numerical difficulty and high dimensionality may be avoided by employing a coarse grid in cases where the application does not require a detailed shape match.

The next experiment involves the pairs of a 64×64×64 binary voxelized pose shape and its corresponding depth image to validate the proposition that the embodiment of 3D-based TMSD is superior to contemporary 2D-based depth image analysis for shape representation. The latter is made by orthographically projecting the former along the z axis to an image plane parallel to the x-y plane. The intensity is proportional to $(z-z_{min})$ where $z_{min}$ is the minimum z coordinate. The Tchebichef moment descriptors of the binary-voxelized shape (3D B-TMSD) and the depth image (2D TMID) are computed for the pairs of 3D and 2D objects, respectively. The performance comparison was made between 3D B-TMSDs and 2D TMIDs of similar dimensions. This procedure ensures comparable datasets and configurations for testing to see if 3D outperforms 2D, by limiting the varying factor to the different z direction representation models only. The matching orders and dimensions between the 3D ($R_3$ and $D_3$, respectively) and 2D ($R_2$ and $D_2$, respectively) descriptors are shown in Table 2.

TABLE 2

Matching of Descriptor Sets between Binary Voxelization and Depth Image for Grids Size N = 64

| | Match Set 1 | Match Set 2 | Match Set 3 | Match Set 4 |
|---|---|---|---|---|
| 3D Order ($R_3$)/Dimension ($D_3$) | 6/84 | 8/165 | 12/455 | 16/969 |
| 2D Order ($R_2$)/Dimension ($D_2$) | 12/91 | 17/171 | 29/465 | 42/946 |

Figure 10A:
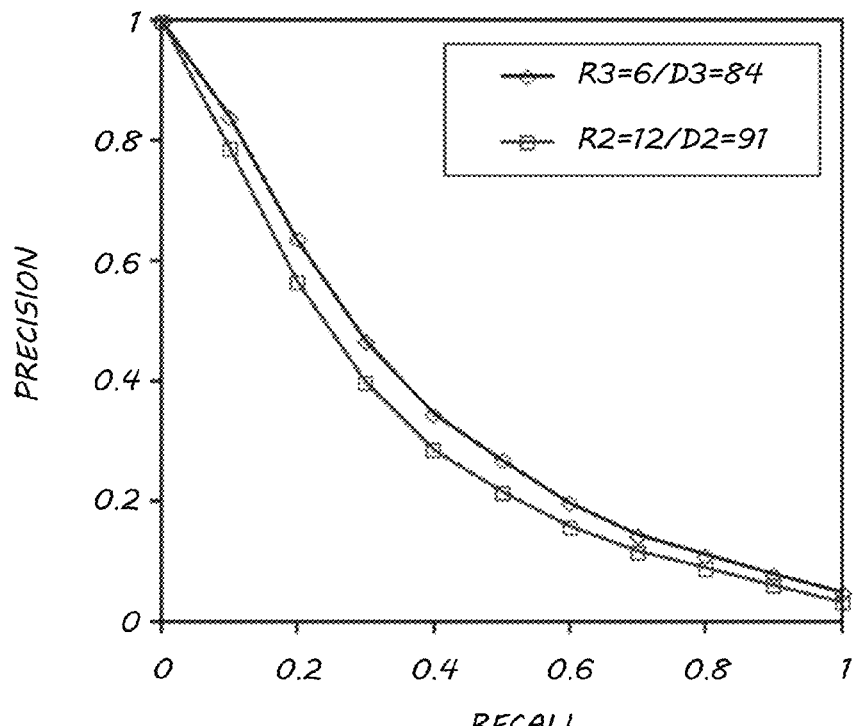
FIGS. 10A and 10B are graphs of PR curves of 3D B-TMSD based on binary voxelizations vs. 2D TMID based on depth images for pose shape queries.
Figure 10B:
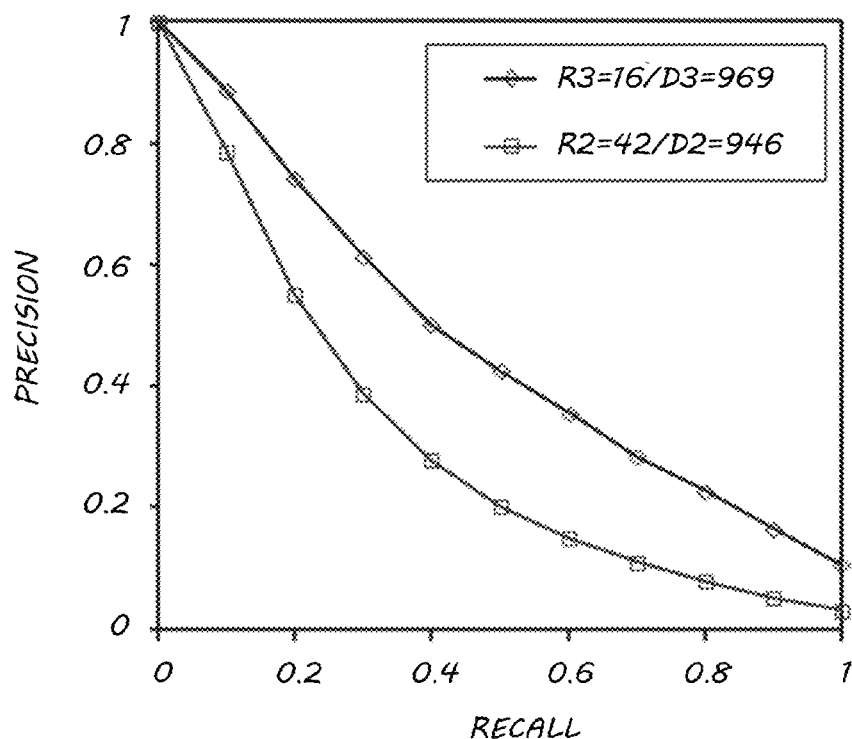

The comparisons of pose shape retrieval performance for Match Sets 1 and 4 are shown in FIGS. 10A and 10B. They clearly demonstrate the superior performance of 3D descriptors over 2D descriptors. The difference is more prominent when higher orders are included. This is because, under the setup of the experiment, the 2D TMID of a depth image is similar to the 3D B-TMSD with a degenerated constant (zero order) basis function for the z direction. Therefore, when more orders are introduced in 3D B-TMSD, the difference between it and 2D TMID increases. In addition, there seems to be no performance gain when the order of 2D TMID is increased from 12 to 42. This may imply a less pair-wise inter-cluster separation within the 2D descriptor space than that within the comparable 3D descriptor space.

This next experiment was designed as a benchmark test of 3D TMSD. Among the descriptor sets of different configurations, the results of those with a grid size N=64 are presented here. For 3D DWT, this grid size allows at least 3 levels (L=3) of wavelet decomposition to produce an approximation array of size 8×8×8=512 as the shape descriptor. Among the aforementioned three wavelets, the experiments indicate symlet (sym4) outperforms Haar and db4. Therefore, sym4 was selected as the test wavelet for this illustrated embodiment, though other wavelets may be selected for other embodiments.

Figure 11:
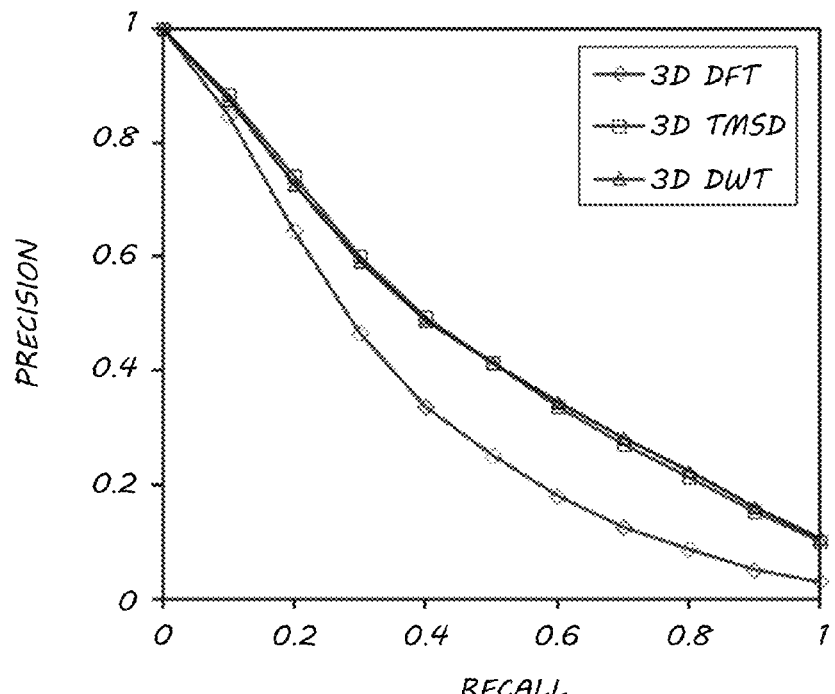
FIG. 11 is a graph of performance comparison of different descriptors.

The comparable order for 3D TMSD and 3D DFT with the closest descriptor size to 3D DWT is 12; both have 50 fewer components than that of 3D DWT. The results with other combinations of configuration parameters, including 1 or 2 levels of wavelet decomposition, are similar to those presented here. FIG. 11 shows the performance comparison among the three types of descriptors. The much lower performance of 3D DFT was expected because more than a half of its components are complex conjugates. It is also known that DFT is not the best in energy compactness.

3D TMSD and 3D DWT have similar retrieval performance. However, if 3D TMSD is not limited to the comparable descriptor size of 3D DWT approximation, the optimal TMSD order R=16 may be used to get a better performance than that of 3D DWT. This highlights that 3D TMSD is easier to scale-up than 3D DWT. The dyadic sampling of 3D DWT means that the descriptor size changes $2^3$ times for each level change. For example, the number of components in 3D DWT would increase from 512, at the current decomposition level, to 4,096 at the next refined level, which is probably too large for an effective distance measurement. Therefore, 3D TMSD is a better alternative to 3D DWT for pose shape query if one prefers this flexibility in order-scaling. If the basis functions for TMSD are pre-computed and saved, the time complexity between TMSD and DWT is also comparable.

In real-world applications, sensors typically do not know and cannot control the orientation of the targets. So, the assessment of retrieval performance should look into the effect of viewing angles. A descriptor is useless for sensor data exploitation if it can perform only under certain viewing angles. Unfortunately, this issue has not received much attention before. By leveraging the full range of viewing angles in the baseline, a detailed examination was conducted on 3D TMSD's performance consistency with respect to both azimuth and elevation angles.

Figure 12:
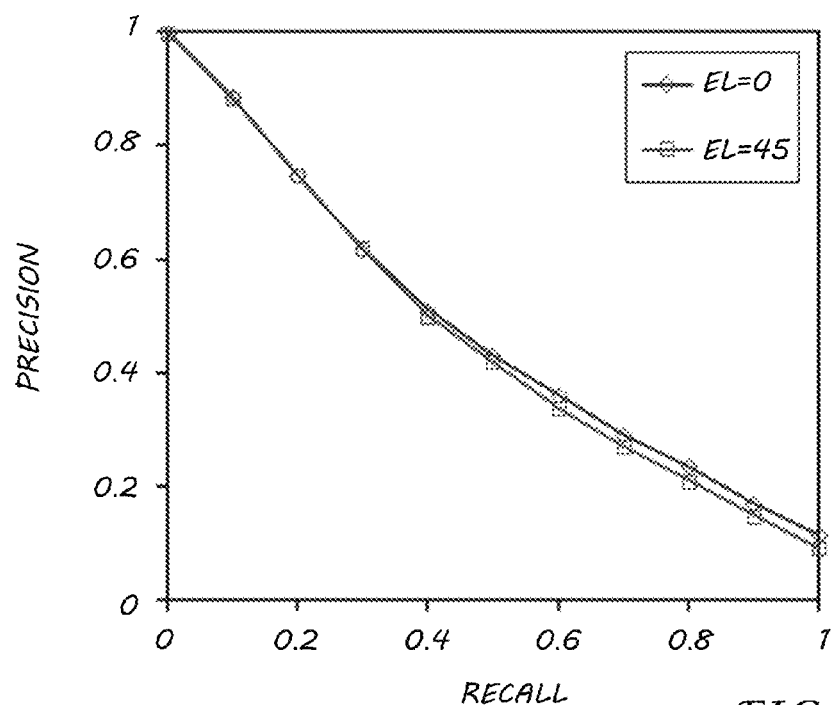
FIG. 12 is a graph of 3D TMSD performance comparison between subsets of elevation angle 0 and 45 degrees.

Based on the previous experimental results, only the results for N=64 and R=16 are presented here. The other configurations have similar patterns. FIG. 12 shows the comparison of overall retrieval performance between the subsets of two elevation angles. The ground level performance is slightly better at the tail region of the PR curves, which is less significant than the head region for CBIR applications. For most practical uses, the results show the performance consistency of 3D TMSD up to medium elevation angles.

Figure 13A:
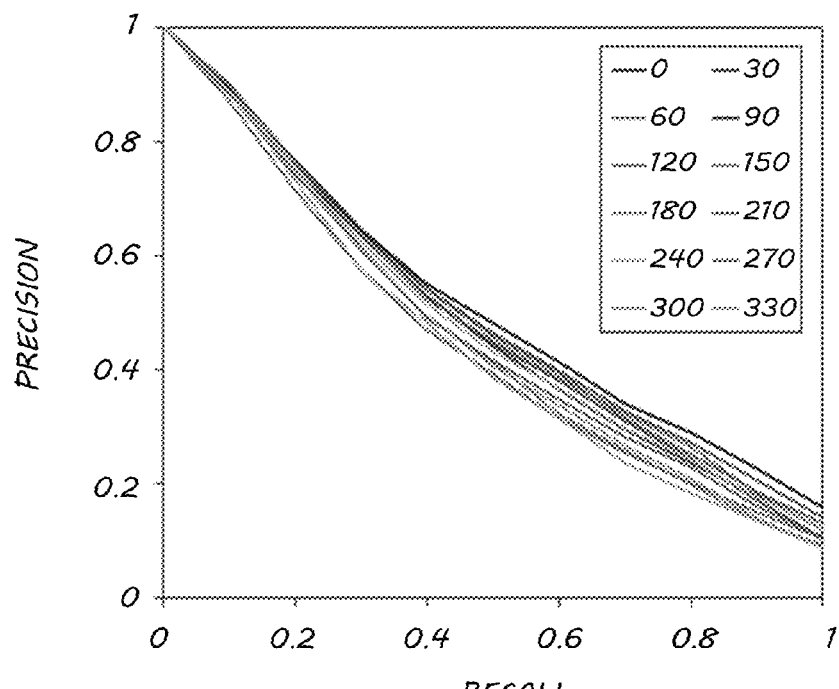
FIGS. 13A and 13B are graphs of 3D TMSD performance with respect to azimuth angles.
Figure 13B:
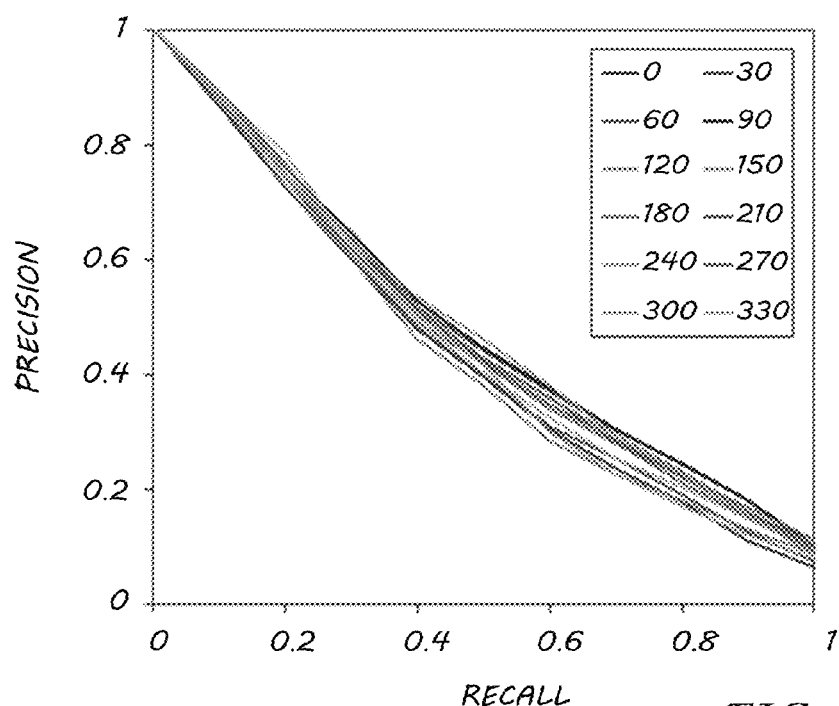

FIGS. 13A and 13B illustrate the performance for individual azimuth angles. First, the ideal viewing angles appear to be 60, 90 and 120 degrees from the left side of the body. This may be due to the fact that all subjects are right-handed and hence their bodies have the most exposure to the sensors on the left side. Second, there is some deviation of retrieval performance with respect to azimuth angles. This effect seems to be reduced with elevated viewing angles, as shown by the slightly narrower deviation across azimuth values in the case of 45 degree elevation angle.

Figure 14A:
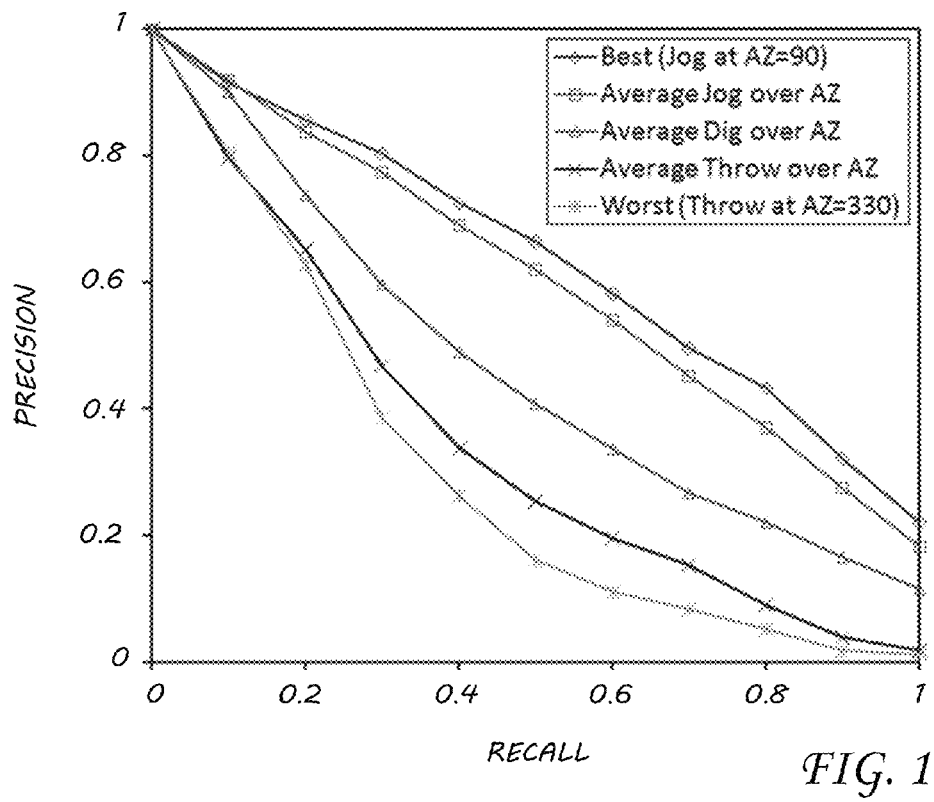
FIGS. 14A and 14B are graphs of 3D TMSD performance with respect to the action type as well as the overall best and worst results.
Figure 14B:
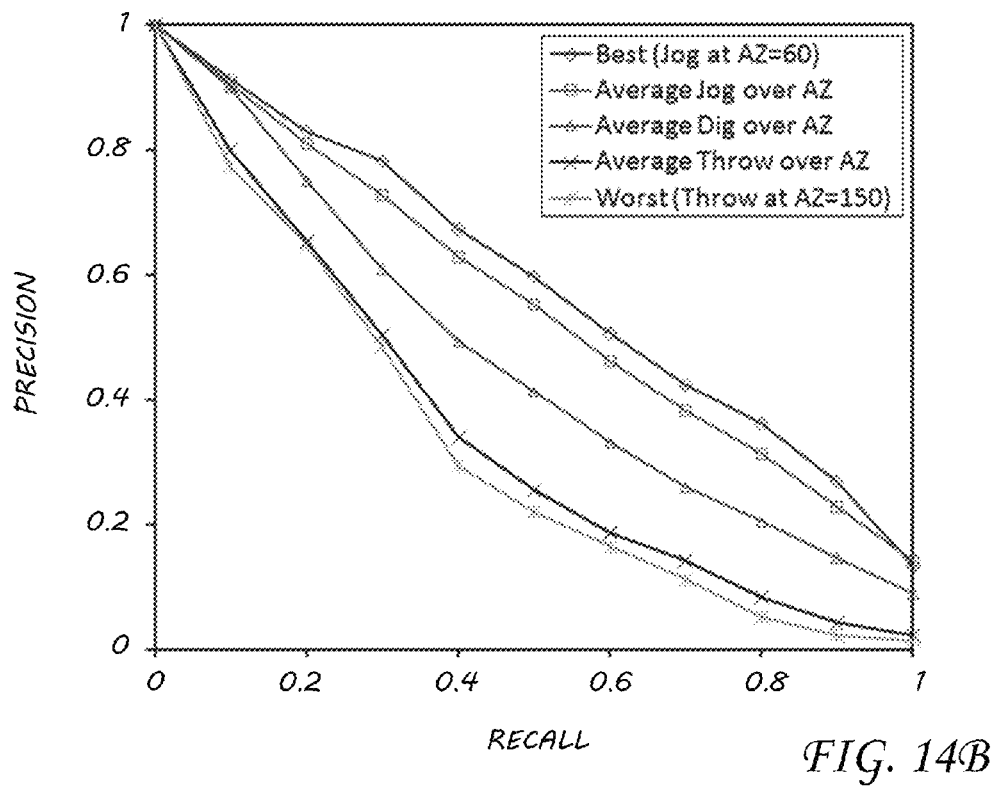

Finally, the effect of action type was considered by comparing the PR curves of three action types per elevation angle, as shown in FIGS. 14A and 14B. It is speculated that the low scores of the throwing action result from: 1) it has more style variations than the other two and 2) its swing pose shapes could be mixed up with some of the digging pose shapes. In FIGS. 14A and 14B, the best and worst PR curves were also plotted for each elevation angle, and there are rather dramatic differences between the two. The performance difference shown in FIGS. 14A and 14B also may have been influenced by rigid grounding truthing process, such that different viewing angles of the same pose were considered as different classes, regardless weather the actual pose shapes are similar or not. An alternative way to assess TMSD's performance could be based on the most consistent type of action, i.e., the jogging action. For the jogging action, it appears that 3D TMSD performs very well, considering the difficulty in representing the degenerated point cloud patches.

Regarding FIG. 4, an experiment was conducted on four different scales of 75%, 50%, 25%, and 6% of the full-scale baseline. At each of these scales, four subjects (2 males and 2 females) were selected from the nine-subject baseline to create a reduced-scale subset. Each of the point cloud patches in the subset was then voxelized using the PGVN scheme and queried against the entire full-scale baseline using the 1-NN query based on 3D TMSD. If the full-scale return has the same subject number, action type, viewing angle, and frame number as those of the reduced-scale, it is considered as an exact match and hence a perfect normalization. Because the synthetic data have the frame-rate of 15 frames per second, two consecutive frames usually have very similar point clouds, and it may not be possible to capture the detail difference at the orders employed by the 3D TMSD. Therefore, if the returned frame number is off by only one but other parameters are the same, it also implies a good normalization. Table 3 shows the percentages of the perfect match and the one-offset match in 1-NN queries of the normalization test for zero-degree elevation angle. The results for 45-degree elevation angle are similar.

TABLE 3

"Perfect match %/One-offset match %" in 1-NN query returns of four different scale tests (SD = 3D TMSD, EL = 0)

| Size N | Order R | 75% Scale | 50% Scale | 25% Scale | 6% Scale |
|---|---|---|---|---|---|
| 16 | 8 | 94.3%/99.1% | 93.2%/99.0% | 91.0%/97.6% | 64.7%/86.0% |
|  | 16 | 96.5%/99.4% | 95.8%/99.5% | 94.7%/98.7% | 77.2%/92.4% |
|  | 24 | 96.9%/99.5% | 96.2%/99.5% | 95.1%/98.9% | 79.6%/93.2% |
| 64 | 8 | 95.3%/99.2% | 94.1%/99.1% | 92.0%/98.0% | 68.5%/88.9% |
|  | 16 | 97.3%/99.5% | 96.6%/99.5% | 95.0%/98.8% | 80.9%/93.7% |
|  | 24 | 97.6%/99.6% | 97.2%/99.6% | 95.8%/99.0% | 83.9%/94.7% |

The results demonstrate that the approach can achieve almost perfect scale invariance and resolution invariance down to 25% of the full-scale point clouds. At the extremely small scale of 6%, the point clouds are roughly equivalent to a body height of 20 pixels, at which level the pose shape is hard to be distinguished by human eyes. In this case, even though the perfect match scores drop considerably, the one-offset match scores could be close to 94%, which is impressive considering the very coarse-grain nature of the point clouds at this scale/resolution. This means that pose shape searching and recognition could be performed at a very low resolution at which the performance of existing 2D methods may degrade significantly. Therefore, these results not only demonstrate the scale and resolution invariance of the approach but also further support the proposition that the embodiment of 3D-based TMSD is superior to contemporary 2D-based depth image analysis for shape representation.

Figure 15:
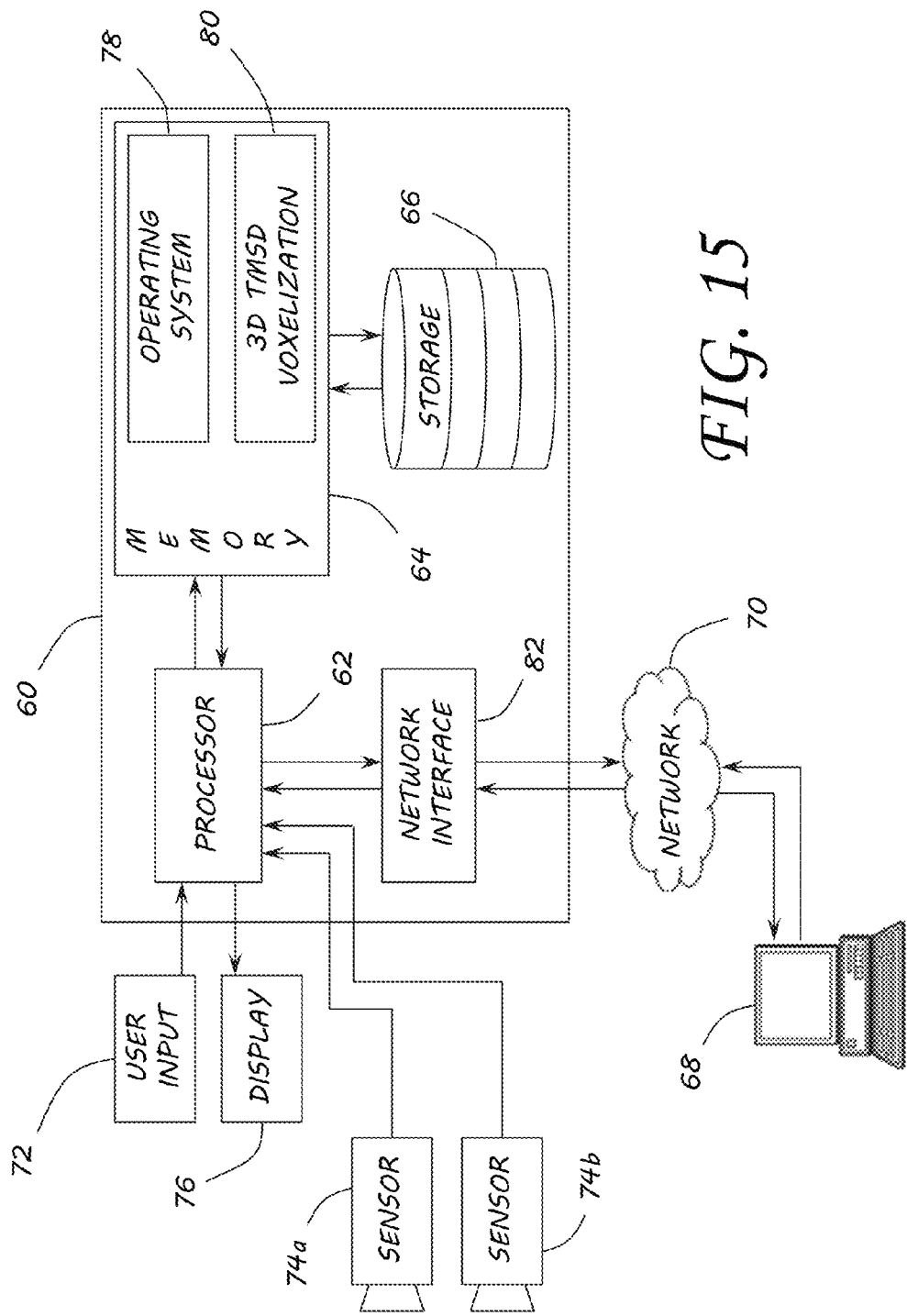
FIG. 15 is a schematic block diagram of an exemplary hardware and software environment suitable for implementing embodiments of the invention.

FIG. 15 illustrates an exemplary hardware and software environment for an apparatus suitable for characterizing point clouds in a manner consistent with the invention. For the purposes of the invention, apparatus may represent practically any computer, computer system, or programmable device, e.g., multi-user or single-user computers, desktop computers, portable computers, tablets and devices, handheld devices, network devices, mobile phones, etc. The apparatus will hereinafter be referred to as a "computer" although it should be appreciated that the term "apparatus" may also include other suitable programmable electronic devices.

Computer 60 typically includes at least one processor 62 coupled to a memory 64. Processor 62 may represent one or more processors (e.g. microprocessors), and memory 64 may represent random access memory (RAM) devices comprising the main storage of computer 60, as well as any supplemental levels of memory, e.g., cache memories, non-volatile or backup memories (e.g. programmable or flash memories), read-only memories, etc. In addition, memory 64 may be considered to include memory storage physically located elsewhere in computer, e.g., any cache memory in a processor, as well as any storage capacity used as a virtual memory, e.g., as stored on a mass storage device 66 or another computer 68 coupled to computer 60 via a network 70.

Computer 60 also typically receives a number of inputs and outputs for communicating information externally. For interface with a user or operator, computer typically includes one or more user input devices 72 (e.g., a keyboard, a mouse, a trackball, a joystick, a touchpad, a keypad, a stylus, and/or a microphone, among others). Additionally, one or more sensors 74a, 74b may be connected to computer 60, which may generate point cloud data as set out above. Computer 60 may also include a display 76 (e.g., a CRT monitor, an LCD display panel or other projection device, and/or a speaker, among others). The interface to computer 60 may also be through an external device connected directly or remotely to computer 60, or through another computer 68 communicating with computer 60 via a network 70, modem, or other type of communications device.

Computer 60 operates under the control of an operating system 78, and executes or otherwise relies upon various computer software applications, components, programs, objects, modules, data structures, etc. (e.g. 3D TMSD, PGVN voxelizations) 80. Computer 60 communicates on the network 70 through a network interface 82.

In general, the routines executed to implement the embodiments of the above described invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has been described in the context of an application that could be implemented on fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to non-transitory physical, recordable type media such as volatile and non-volatile memory devices, floppy and other removable disks, hard disk drives, optical disks (e.g., CD-ROM's, DVD's, etc.), among others; and transmission type media such as digital and analog communication links.

In addition, various program code described may be identified based upon the application or software component within which it is implemented in specific embodiments of the invention. However, it should be appreciated that any particular program nomenclature is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 15 is not intended to limit the present invention. Indeed, those skilled in the art will recognize that other alternative hardware and/or software environments may be used without departing from the scope of the invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A process for characterizing global shape pattern of low-resolution, partial point clouds, the process comprising:
   receiving a partial point cloud representation of an object from a sensor;
   computing zero and first order geometric moments of the partial point cloud;
   computing a location of a center of a point cloud mass using the zero and first order geometric moments;
   generating a bounding box;
   dividing the bounding box into a three dimensional grid;
   generating a normalized voxel mass distribution over the three dimensional grid;
   calculating Tchebichef moments of different orders with respect to the voxel mass distribution in the grid; and
   collecting low-order moments to form a one-dimensional numerical vector containing 3D Tchebichef Moment Shape Descriptors (TMSD).

2. The method of claim 1, further comprising:
   comparing the similarity between the TMSD of the point cloud with TMSDs of other point clouds of known classes of shapes for partial point cloud based object recognition or query.

3. The method of claim 2, wherein comparing the similarity comprises:
   a multi-scale nearest neighbor (NN) query.

4. The method of claim 1, wherein generating a bounding box comprises:
   generating a bounding box centered at the location of the center of the point cloud mass.

5. The method of claim 4, wherein one side of the box bounding the point cloud is at its longest semi-axis.

6. The method of claim 1, wherein the bounding box is a cubic bounding box.

7. The method of claim 1, wherein the three dimensional grid is a three equal-dimensional grid.

8. The method of claim 7, wherein the bounding box is divided into an N×N×N grid, where N is selected from a group consisting of: 16, 32, 64.

9. An apparatus, comprising:
   a sensor configured to generate a partial point cloud representation of an object;
   a memory in electrical communication with the sensor and configured to store the partial point cloud generated by the sensor;
   a processor in electrical communication with the memory; and
   program code resident in the memory and configured to be executed by the processor to characterize partial point clouds, the program code further configured to retrieve the partial point cloud representation of an object stored in the memory, compute zero and first order geometric moments of the partial point cloud, compute a location of a center of a point cloud mass using the zero and first order geometric moments, generate a bounding box, divide the bounding box into a three dimensional grid, generate a normalized voxel mass distribution over the three dimensional grid, calculate Tchebichef moments of different orders with respect to the voxel mass distribution in the grid, and collect low-order moments to form a one-dimensional numerical vector containing 3D Tchebichef Moment Shape Descriptors (TMSD).

10. The apparatus of claim 9, wherein the program code is further configured to:
    compare the similarity between the TMSD of the point cloud with TMSDs of other point clouds of known classes of shapes for partial point cloud based object recognition or query.

11. The apparatus of claim 10, wherein comparing the similarity comprises:
    a multi-scale nearest neighbor (NN) query.

12. The apparatus of claim 9, wherein generating a bounding box comprises:
    generating a bounding box centered at the location of the center of the point cloud mass.

13. The apparatus of claim 12, wherein one side of the box bounding the point cloud is at its longest semi-axis.

14. The apparatus of claim 9, wherein the bounding box is a cubic bounding box.

15. The apparatus of claim 9, wherein the three dimensional grid is a three equal-dimensional grid.

16. The apparatus of claim 15, wherein the bounding box is divided into an N×N×N grid, where N is selected from a group consisting of: 16, 32, 64.

17. A program product, comprising:
    a non-transitory computer recordable type medium; and
    a program code configured to be executed by a hardware based processor to characterize partial point clouds, the program code further configured to retrieve the partial point cloud representation of an object from a sensor, compute zero and first order geometric moments of the partial point cloud, compute a location of a center of a point cloud mass using the zero and first order geometric moments, generate a bounding box, divide the bounding box into a three dimensional grid, generate a normalized voxel mass distribution over the three dimensional grid, calculate Tchebichef moments of different orders with respect to the voxel mass distribution in the grid, and collect low-order moments to form a one-dimensional numerical vector containing 3D Tchebichef Moment Shape Descriptors (TMSD).

18. The program product of claim 17, wherein the program code is further configured to:

compare the similarity between the TMSD of the point cloud with TMSDs of other point clouds of known classes of shapes for partial point cloud based object recognition or query.

19. The program product of claim 18, wherein comparing the similarity comprises:

a multi-scale nearest neighbor (NN) query.

20. The program product of claim 17, wherein generating a bounding box comprises:

generating a cubic bounding box centered at the location of the center of the point cloud mass, wherein one side of the box bounding the point cloud is at its longest semi-axis.

* * * * *